United States Patent [19]
Hayashida et al.

[11] Patent Number: 6,117,553
[45] Date of Patent: Sep. 12, 2000

[54] MULTI-LAYER SELF-TACK WRAPPING FILM

[75] Inventors: Haruo Hayashida, Chiba; Eisuke Shiratani; Kouichi Yanase, both of Ichihara, all of Japan

[73] Assignee: Sumitomo Chemical Company, Limited, Osaka, Japan

[21] Appl. No.: 08/964,334

[22] Filed: Nov. 4, 1997

[30] Foreign Application Priority Data

Nov. 28, 1996 [JP] Japan ................................. 8-318276
Jul. 29, 1997 [JP] Japan ................................. 9-203262

[51] Int. Cl.$^7$ .......................... B32B 27/36; B32B 27/08
[52] U.S. Cl. .......................... 428/412; 428/515; 428/516
[58] Field of Search ...................... 428/412, 476.3, 428/515, 516, 519, 35.7, 355 EN, 355 BL, 354, 521

[56] References Cited

U.S. PATENT DOCUMENTS

| | | | |
|---|---|---|---|
| 3,262,992 | 7/1966 | Holzer et al. | 260/876 |
| 3,354,239 | 11/1967 | Short et al. | 260/876 |
| 4,857,594 | 8/1989 | Lakshmanan et al. | 525/98 |
| 4,879,147 | 11/1989 | Newman et al. | 428/35 |
| 5,109,069 | 4/1992 | Shibata et al. | 525/152 |
| 5,122,415 | 6/1992 | Schinkel et al. | 428/349 |
| 5,219,628 | 6/1993 | Hathaway et al. | 428/36.9 |
| 5,376,437 | 12/1994 | Kawakami et al. | 428/216 |
| 5,492,767 | 2/1996 | Yazaki et al. | 428/500 |
| 5,569,693 | 10/1996 | Doshi et al. | 524/317 |
| 5,641,569 | 6/1997 | Hayashida et al. | 428/345 |
| 5,654,372 | 8/1997 | Sadatoshi et al. | 525/323 |
| 5,712,044 | 1/1998 | Fanselow et al. | 428/515 |
| 5,820,979 | 10/1998 | Kitazaki et al. | 428/332 |
| 5,827,559 | 10/1998 | Powell | 426/412 |

FOREIGN PATENT DOCUMENTS

| | | |
|---|---|---|
| 63-102934 | 5/1988 | Japan . |
| 05262374 | 10/1993 | Japan . |
| 06023927 | 2/1994 | Japan . |
| 06122182 | 5/1994 | Japan . |
| 06238848 | 8/1994 | Japan . |
| 07165940 | 6/1995 | Japan . |
| 2322329 | 8/1998 | United Kingdom . |

*Primary Examiner*—Paul Thibodeau
*Assistant Examiner*—Kevin R. Kruer
*Attorney, Agent, or Firm*—Stevens, Davis, Miller & Mosher, L.L.P.

[57] ABSTRACT

There is provided a self-tack wrapping film comprising a non-oriented multi-layer film of a chlorine-free resin, which is regulated in (a) tensile breaking elongation at a longitudinal direction, (b) ratio of a tensile breaking elongation at a transverse direction to the tensile breaking elongation at a longitudinal direction, (c) tensile breaking load at a longitudinal direction (LLD), (d) ratio of the tensile breaking load at a longitudinal direction to a tensile breaking load at a transverse direction, (e) tensile modulus at a longitudinal direction and that at a transverse direction, (f) tackiness, (g) heat resistant temperature and (h) respective thermal shrinkage percents at longitudinal and transverse directions, to a predetermined range, which wrapping film has improved tackiness, heat resistance, microwave oven suitability and "saw blade" cutting characteristics, and appropriate flexibility.

2 Claims, No Drawings

MULTI-LAYER SELF-TACK WRAPPING FILM

BACKGROUND OF THE INVENTION

1. Field of the Invention

The present invention relates to a self-tack wrapping film comprising a chlorine-free resin. More particularly, it relates to a self-tack wrapping film comprising chlorine-free resin and having improved tackiness, heat resistance, microwave oven suitability and cutting characteristics, and appropriate flexibility.

A self-tack wrapping film is capable of preventing foods from evaporation of water during storage in a refrigerator, evaporation of water during a heating in a microwave oven, diffusion of flavor or taste, or getting scented with other odors during storage, or getting dusty, and therefore largely used in families, restaurants and hotels for hermetically sealing foods.

With recent wide-spreading use of a microwave oven, demand in this use has remarkably increased. That is, a self-tack wrapping film is largely used for hermetically sealing foods placed on a ceramic- or glass-made container to prevent foods from evaporation of water and loss of taste in a microwave oven.

The wrapping film used in this use is required to be excellent in not only adhesion to the container but also tackiness property between films. Moreover, the wrapping film is required to be small in thermal shrinkage and free from perforations, thermal fusion and whitening in a microwave oven. In this specification, these properties are referred to as a microwave oven suitability.

2. Description of the Related Art

As a conventional self-tack wrapping film, those prepared using polyethylene or chlorine-containing resins such as polyvinyl chloride and polyvinylidene chloride as a main component are known.

However, the film made of polyethylene has a defect such that perforations are readily formed when the film is brought into contact with hot oily or fatty materials such as edible meats or fried foods so as to be allowed to stand at a high temperature. The film made of polyvinyl chloride has a problem such that it readily exhibits whitening when brought into contact with boiling hot water. The film made of polyvinylidene chloride is large in thermal shrinkage and more expensive than the above two types of films.

Therefore, none of these conventional wrapping films can be said to be satisfactory in a microwave oven suitability.

The wrapping film is usually used in the form of a film of 20 to 45 cm in width and 8 to 15 µm in thickness, which is rolled on a core material usually made of paper and kept in a case such as a paper box. In the use of the film, the film is drawn out from the case to a desired length, brought into contact with a blade called "saw blade" provided with the case at a portion to be cut out and then pulled to be cut into a suitable length.

As the "saw blade", a simple blade obtained by punching out an iron plate or cardboard having a thickness of about 0.2 mm into a shape of saw is usually used. Moreover, the case supporting the "saw blade" is usually a coated cardboard box having a basis weight of about 350 to 700 g/m², which is therefore extremely low in stiffness.

In view of the foregoing, the wrapping film is also required to be easily cut out even by such a simple cutting mechanism. Namely, the film is required to have a good cutting characteristics.

In the case of the film made of polyvinylidene chloride, once a tear appears at a certain position of the film at the time of cutting, the tear extends so as to cut the film not along the "saw blade" but slantingly. In the case of the film made of polyvinyl chloride or polyethylene, elongation of the film at the time of cutting is too large to obtain sharp cutting.

In a meanwhile, the film made of the chlorine-containing resin such as polyvinylidene chloride or polyvinyl chloride is appropriate in flexibility and therefore successfully used in this respect. However, the film contains a large quantity of chloride and therefore produces chlorine gas upon incineration Moreover, the film contains a large quantity of harmful plasticizers. For these reasons, the film cannot be said to be satisfactory also from an environmental point of view.

Thus, a self-tack wrapping film made of a chlorine-free resin has been attempted to be developed. For example, Japanese Patent Laid-Open No. (JP-A-) 6-238848 proposes a film obtained by laminating a terpolymer film layer of ethylene, propylene and α-olefin having 4 to 8 carbon atoms on one side or both sides of a polycarbonate resin film layer. Further, Japanese Patent Laid-Open No. (JP-A) 6-122182 proposes a wrapping film obtained by disposing a polyolefin resin layer on both sides of a polyamide resin layer, wherein an adhesion layer of a modified resin composition obtained by melt-mixing an acid-modified polyolefin and a polyamide resin is placed between the polyamide resin layer and the polyolefin resin layer.

However, there has never been obtained a self-tack wrapping film of a chlorine-free resin capable of simultaneously satisfying tackiness, heat resistance, microwave oven suitability, "saw blade" cutting characteristics and appropriate flexibility.

BRIEF SUMMARY OF THE INVENTION

An object of the present invention is to provide a self-tack wrapping film of a chlorine-free resin, which simultaneously satisfies tackiness, heat resistance, microwave oven suitability and "saw blade" cutting characteristics, and has an appropriate flexibility.

The present invention provides a self-tack wrapping film comprising a non-oriented multi-layer film of a chlorine-free resin, which satisfies the following properties (a) to (h), (a) tensile breaking elongation at a longitudinal direction (ELD) being from 10 to 150%, (b) ratio of a tensile breaking elongation at a transverse direction (ETD) to the tensile breaking elongation at a longitudinal direction (ELD), i.e. ETD/ELD, being from 0.5 to 3, (c) tensile breaking load at a longitudinal direction (LLD) being from 150 to 800 kg/cm², (d) ratio of the tensile breaking load at a longitudinal direction (LLD) to a tensile breaking load at a transverse direction (LTD), i.e. LLD/LTD, being from 0.5 to 2, (e) tensile modulus at a longitudinal direction and that at a transverse direction being from 2000 to 8000 kg/cm², respectively, (f) tackiness being from 3 to 20 g/10cm, (g) heat resistant temperature being 140° C. or higher, and (h) thermal shrinkage percent at a longitudinal direction and that at a transverse direction being 10% or less, respectively.

DETAILED DESCRIPTION OF THE INVENTION

In the present invention, the properties (a) to (h) are those measured by the following methods.

(1) Tensile breaking elongation and load:

Measured according to the method prescribed in JIS K6781.

(2) Tensile modulus (Young's modulus):

Measured according to the method prescribed in ASTM D882 at longitudinal and transverse directions.

Shape of the test piece : stripe of 20 mm×120 mm

A smaller value means a higher flexibility.

(3) Tackiness:

A test piece film of 10 cm in a width and 15 cm in a length is tightly contacted with a 10 cm×10 cm glass plate, and a load of 500 g was applied to the film at 23° C., 50%RH (relative humidity) for 30 minutes. Then, one longitudinal end of the film is tightly grasped with a jig and pulled up perpendicularly from the glass plate at a rate of 200 mm/minute to peel off the film. The force required for the peeling off is measured and expressed in terms of g/10 cm, and taken as a tackiness.

(4) Heat resistant temperature (heat resistance):

According to the Regulations Governing the Organization of Tokyo Metropolis No. 1072, a test piece stripe film of 3 cm in a width and 14 cm in a length is grasped with jigs at positions of 2.5 cm distance from the upper and lower ends thereof, and a weight of 10 g is hung down from the lower end. A highest atmospheric temperature, at which the film is kept unbroken even after a lapse of one hour under the conditions mentioned above is measured, and expressed in ten degrees.

(5) Thermal shrinkage percent:

A test piece film prepared by cutting the film into a square of respective 9 cm at longitudinal and transverse directions is dipped in a silicone oil bath kept at 140° C. for 5 seconds and withdrawn therefrom. Thereafter, respective dimensions at longitudinal and transverse directions (x) are measured, and respective thermal shrinkage percents at both directions are calculated by the following formula:

$$s=(1-x/9)\times 100(\%)$$

In practicing the present invention, the tensile breaking elongation at a longitudinal direction (a) of the multi-layer film of the present invention is from 10 to 150%, preferably from 15 to 100%, more preferably from 20 to 50%. When the tensile breaking elongation is less than 10%, the resulting wrapping film is easily perforated in case of wrapping crustaceans or the like foods. On the other hand, when it is more than 150%, the "saw blade" cutting characteristics become poor.

The ratio (b) of the tensile breaking elongation at a transverse direction (ETD) to that at a longitudinal direction (ELD), i.e. ETD/ELD, is from 0.5 to 3, preferably from 0.8 to 2.5. When the ratio is less than 0.5 or more than 3, workability in wrapping foods or containers lowers.

The tensile breaking load at a longitudinal direction (c) is from 150 to 800 kg/cm$^2$, preferably from 200 to 600 kg/cm$^2$. When the load is less than 150 kg/cm$^2$, a strength of the resulting wrapping becomes poor, so that the wrapping film happens to be broken in wrapping foods or containers. While, when it is more than 800 kg/cm$^2$, resistance in cutting the film with a saw blade becomes too large, so that workability deteriorates and moreover a case supporting the saw blade, wherein the film is kept is deformed.

The ratio (d) of the tensile breaking load at a longitudinal direction (LLD) to that at a transverse direction (LTD), i.e. LLD/LTD, is from 0.5 to 2, preferably 0.8 to 1.3. When the ratio is less than 0.5 or more than 2, workability in wrapping foods or containers lowers.

The tensile modulus at a longitudinal direction and that at a transverse direction (e) are 2000 to 8000 kg/cm$^2$, preferably 3000 to 5000 kg/cm$^2$, respectively. When the tensile modulus is less than 2000 kg/cm$^2$, the resulting wrapping film is too flexible to be easily handled. On the other hand, those more than 8000 kg/cm$^2$ result in the production of a too hard wrapping film, so that adhesion of the film to foods or containers becomes poor.

The tackiness (f) of the multi-layer film is from 3 to 20 g/10 cm, preferably 5 to 15 g/10 cm. When the tackiness is less than 3 g/10 cm, it becomes hard to seal foods or containers hermetically. On the other hand, when the tackiness is more than 20 g/10 cm, the wrapping film rolled on a core material is hardly drawn out therefrom.

The heat resistant temperature (g) of the multi-layer film is 140° C. or higher, preferably 150° C. or higher, more preferably 160° C. or higher. When the said temperature is lower than 140° C., the resulting wrapping film is easily perforated on cooking using the wrapped foods in a microwave oven.

The thermal shrinkage percents (h) at longitudinal and transverse directions are 10% or less, preferably 5% or less, respectively. When the shrinkage percent exceeds 10%, shrinkage of the wrapping film becomes large, so that the film is easily torn or perforated on cooking using the wrapped foods in a microwave oven.

The chlorine-free resin used in the production of the multi-layer film in accordance with the present invention includes, for example, ethylene-based resins, propylene-based resins, styrene-based resins, polycarbonate-based resins, poly(4-methylpentene-1) resins, methacrylate resins, polybutenes, polyesters, polyamides and recycled resins thereof.

In the present invention, the chlorine-free resins are used singly or in a mixture thereof. In addition, they may be used in a mixture with a modifier such as hydrogenated styrene butadiene rubber.

Examples of the ethylene-based resins are low density polyethylene, middle density polyethylene, high density polyethylene, ethylene-α-olefin copolymers such as an ethylene-propylene copolymer, ethylene-butene-1 copolymer, ethylene-4-methylpentene-1 copolymer, ethylene-hexene-1 copolymer, ethylene-octene-1 copolymer and ethylene-decene-1 copolymer, and other copolymers of ethylene with unsaturated compounds such as conjugated or non-conjugated dienes or copolymerizable compounds such as acrylic acid, methacrylic acid or vinyl acetate. The ethylene-based resins also include their acid-modified resins obtainable, for example, by graft-modifying the above-mentioned copolymers with α,β-unsaturated carboxylic acids, alicyclic carboxylic acids or derivatives thereof.

The propylene-based resins used in the present invention are those mainly composed of propylene, and include propylene homopolymers and random or block copolymers of propylene with at least one α-olefin such as ethylene, butene or hexene. Of these, those having a maximum melting peak temperature ($T_{pm}$) of not lower than 150° C. are preferred.

In the present invention, from a viewpoint of the flexibility, particularly preferably used is a propylene block copolymer obtainable by a process which comprises producing 40 to 85% by weight of a propylene-ethylene copolymer having an ethylene content of 1.5 to 6.0% by weight as a first step (the said relatively low ethylene content propylene-ethylene copolymer being hereinafter referred to as a component A.), and producing 60 to 15% by weight of a propylene-ethylene copolymer having an ethylene content of 7 to 17% by weight as a second step (the said relatively high ethylene content propylene-ethylene copolymer being hereinafter referred to as a component B.), wherein an intrinsic viscosity of the component B ($[\eta]B$) is from 2 to 5 dl/g and a ratio of the intrinsic viscosity of the component B to that of the component A ($[\eta]A$), i.e. $[\eta]B/[\eta]A$, is from 0.5 to 1.8.

The propylene block copolymer in accordance with the present invention is, as mentioned above, one obtainable by producing the propylene-ethylene copolymers of relatively low and high ethylene contents in two steps, and therefore cannot be said to be a typical block copolymer in which the end of one component block is bonded to the end of the other component block. It can be rather said to be a certain blend-type copolymer.

In producing the propylene block copolymer, it is preferred to avoid making the ethylene content of the component A(EA) less than 1.5% by weight or more than 6.0% by weight. Too low ethylene contents tend to lower the flexibility, and too high ethylene contents tend to lower the heat resistance. An ethylene content of from 2.5 to 4.5% by weight is particularly preferred from a viewpoint of balance between the flexibility and the heat resistance.

As to the ethylene content of the component B(ED), it is also preferred to avoid making it less than 7% by weight or more than 17% by weight. Too low contents tend to lower the low temperature resistance, while too high contents tend to lower the transparency. An ethylene content of from 8 to 12% by weight is particularly preferred from a viewpoint of balance between the low temperature resistance and the transparency.

The difference between the ethylene content of the component B and the ethylene content of the component A (EB-EA) is preferably from 3 to 15% by weight, more preferably from 5 to 10% by weight from a viewpoint of balance of the transparency and the low temperature resistance.

The ethylene content is measured by a $^{13}$C-NMR method according to the method described in Polymer Hand book (1995, published by Kinokuniya Bookstore), 616 page.

The ethylene content of the component A(EA) is measured immediately after completion of the first step.

The ethylene content of the component B(EB) is measured by measuring the ethylene content of the resulting block copolymer (EAB) after completion of the second step, followed by calculation using the following formula, $$EB=(EAB-EA\times PA/100)\times 100/PB[EA\times PA/100+EB\times PB/100=EAB]$$

wherein EA, EB and EAB are as defined above, and PA and PB are weight ratios (% by weight) of the component A and the component B, respectively. The PA and PB are calculated from the material balance of the components A and B in the polymerization first and second steps, respectively.

The weight ratio of the component A is from 40 to 85% by weight, preferably from 55 to 83% by weight, and that of the component B is from 60 to 15% by weight, preferably from 45 to 17% by weight. (Component A+Component B=100% by weight)

It is preferred to avoid making the weight ratio of the component B less than 15% by weight or more than 60% by weight. Too low weight ratios tend to lower the low temperature resistance, and too high weight ratios tend to lower the heat resistance. A weight ratio of from 17 to 27% by weight is particularly preferred from a viewpoint of moldability.

In the present invention, the block copolymer having a particularly preferred weight ratio of the component B may be obtained by mixing a polymer of the component A prepared in advance with the block copolymer which is prepared by the aforesaid method through the first and second steps and which contains the component B in a relatively large amount within the weight ratio defined above, at a stage of melt-kneading for the film formation.

The $[\eta]B$, the intrinsic viscosity of the component B in the propylene block copolymer, is from 2 to 5 dl/g and the ratio, $[\eta]B/[\eta]A$, is from 0.5 to 1.8. These are required from a viewpoint of transparency.

When the $[\eta]B$ is less than 2 dl/g, the content of a lower molecular weight component may be too large, while when it is more than 5 dl/g, the flowability of the block copolymer may be lowered to deteriorate the processability. Therefore, particularly preferred is from 2.5 to 4.5 dl/g.

It is preferred to avoid making the ratio, $[\eta]B/[\eta]A$, less than 0.5 or more than 1.8 from a viewpoint of the compatibility between the components A and B and the transparency. A ratio of from 0.8 to 1.5 is particularly preferred.

The intrinsic viscosity is measured in tetralin at 135° C. using a Ubbelohde viscometer.

The $[\eta]A$, the intrinsic viscosity of the component A, is measured immediately after completion of the first step.

The $[\eta]B$ is measured by measuring the intrinsic viscosity of the block copolymer ($[\eta]AB$) after completion of the second step, followed by calculation using the following formula, $$=([\eta]AB-[\eta]A\times PA/100)\times 100/PB([\eta]A\times PA/100+[\eta]B\times PB=[\eta]AB)$$

wherein $[\eta]A$, $[\eta]B$, $[\eta]AB$, PA and PB are as defined above.

As to a component contained in the block copolymer, which is soluble in xylene at 20° C. and has a weight average molecular weight of not more than 26000, it is preferred to make a content of the component not more than 6% by weight from a viewpoint of lowering an extraction amount by n-hexane or the like solvent. From a viewpoint of using the resulting film for wrapping foods, it is particularly preferred to make a content of the component not more than 3.5% by weight based on the total weight of the polymer.

The propylene block copolymer usable in the present invention can be produced by a batch-wise polymerization method in which the component A is formed and the component B is subsequently formed in a polymerization vessel or by a continuous polymerization method in which the component A and the component B are continuously formed using at least two polymerization vessels, in the presence of a catalyst, such as, for example, a Ziegler-Natta catalyst.

The polymerization reaction can be carried out at a temperature of from 20 to 150° C., preferably from 50 to 95° C., under a pressure of from atmosphere pressure to 40 kg/cm$^2$G, preferably from 2 to 40 kg/cm$^2$G. In order to regulate the molecular weight, hydrogen is supplied at respective steps of the component A formation and the component B formation.

The Ziegler-Natta catalyst is well known and examples thereof are those comprising at least titanium, magnesium and halogen as an essential component such as a catalyst system comprising (a) a solid catalyst component containing a trivalent titanium compound, which is obtained by preparing a solid product obtained by reducing of a titanium compound and/or an ether compound, the titanium compound being represented by the formula, $Ti(OR^1)_nX_{4-n}$ ($R^1$ is a hydrocarbon group having 1 to 20 carbon atoms, X is a halogen atom, n is a number of 0<n≦4.) with an organomagnesium compound in the presence of an organosilicon compound having a Si-O bond, and then treating the solid product with a mixture of an ether compound and titanium tetrachloride, or a mixture of an ether compound, titanium tetrachloride and an ester compound, (b) an organoaluminum compound, and (c) a silicon compound having Si-OR$^2$ bond (R$^2$ is a hydrocarbon group having 1 to 20 carbon atoms.), wherein the molar ratio of Al atom in (b)/Ti atom in (a) is from 1 to 2000, preferably from 5 to 1500, and the molar ratio of the Al atom in (c)/Al atom in (b) is from 0.02 to 500, preferably from 0.05 to 50.

Flowability, which is expressed in terms of, for example, a melt flow rate, of the propylene block copolymer can be changed by a known method in the presence or absence of an organic peroxy compound. The propylene block copolymer may optionally contain additives such as antioxidants, ultraviolet ray absorbers, anti-static agents, anti-fogging agents, nucleus-forming agents and tackifiers.

The propylene block copolymer may be blended with other resins as far as the effect thereof is not deteriorated. Examples of the resins to be blended include propylene homopolymer, propylene-ethylene copolymer, propylene-butene-1 copolymer, propylene-ethylene-butene-1 copolymer and the like, and the amount thereof is from 5 to 50% by weight based on the total polymer weight.

On the preparation of a film using the propylene block copolymer, additives usually used such as, for example, antioxidants, stabilizers, anti-static agents, tackifiers, anti-fogging agent may be blended.

The thus obtained propylene block copolymer is preferably used singly as the propylene-based resins. Alternatively, the block copolymer is preferably used also in combination with other propylene-based resins, particularly those having a maximum melting peak temperature ($T_{pm}$) of not lower than 150° C., in a blending weight ratio of 95–50 of the block copolymer to 5–50 of the latter.

The styrene-based resin used in the present invention can be prepared by polymerizing styrene or styrenic compounds including α-substituted alkyl-styrene such as α-methyl-styrene and nucleus-substituted alkyl-styrene such as p-methylstyrene, optionally with compounds copolymerizable with styrene or the styrenic compounds such as, for example, vinyl monomers such as acrylonitrile, methacrylonitrile, methacrylic acid, esters such as methyl methacrylate, and maleic anhydride, maleimide, and nucleus-substituted maleimide.

Examples of the styrene-based resin are polystyrene (PS), acrylonitrile-styrene copolymer resin (AS) and methacrylic acid-styrene copolymer resin (MS).

The styrene-based resin can be produced by a known suspension or bulk polymerization.

A so-called rubber-modified styrene-based resin can be used to obtain a film having excellent impact resistance.

The rubber-modified styrene-based resin can be produced, for example, by a bulk polymerization of styrene or the styrenic compounds optionally with the copolymerizable compound in the presence of a rubber polymer. Preferred examples of the rubber polymer are polybutadienes, styrene-butadiene copolymers and terpolymers of ethylene-propylene-non-conjugated diene. The polybutadiene includes high-cis polybutadiene and low-cis polybutadiene.

The rubber polymer is used preferably in an amount of not more than 30 parts by weight based on 100 parts by weight of styrene or the styrenic compound.

The particle size of a soft component dispersed in the polymer matrix is preferably from 0.1 to 5 μm.

The molecular weight of the styrene-based resin including the rubber-modified one is not particularly restricted. Preferred are those having a melt flow rate (MFR) of from 0.5 to 20 g/10 minutes, which is measured at 200° C. under a load of 5 kgf according to JIS K7210.

The styrene-based resin may contain usual additives such as lubricants, anti-static agents, antioxidants, heat stabilizers, ultraviolet absorbers, pigments, dyes, elastomers such as styrene-butadiene block copolymer and plasticizers such as mineral oil, as far as the effect of the present invention is not damaged.

The polycarbonate-based resin used in the present invention is not particularly restricted. The resin can be produced by reacting phosgene with an aromatic dihydroxy compound in the presence or absence of a small amount of a polyhydroxy compound, or by ester exchange reaction of a carbonate diester with an aromatic dihydroxy compound optionally together with a small amount of a polyhydroxy compound. If desired, a trifunctional compound as a branching agent and a molecular weight regulating agent may be used. The polycarbonate-based resin is thermoplastic, and branched or non-branched.

Examples of the aromatic dihydroxy compound are 2,2-bis (4-hydroxyphenyl) propane (bisphenol A), tetramethyl-bisphenol A, tetrabromobisphenol A, bis (4-hydroxyphenyl)-p-isopropylbenzene, hydroquinone, resorcinol, 4,4'-dihydroxyphenyl, bis (4-hydroxyphenyl) methane, bis (4-hydroxphenol) ether, bis (4-hydroxyphenyl) sulfone, bis (4-hydroxyphenyl) sulfoxide, bis (4-hydroxyphenyl) sulfide, bis (4-hydroxyphenyl) ketone, 1,1-bis (4-hydroxyphenyl) ethane, and 1,1-bis (4-hydroxyphenyl) cyclohexane. Of these, bisphenol A is particularly preferable.

In order to obtain the branched polycarbonate-based resin, a part of the dihydroxy compound, for example 0.1 to 2% by mol thereof is replaced by a polyhydroxy compound such as, for example, fluoroglucine, 4,6-dimethyl-2,4,6-tri (4-hydroxyphenyl) heptine, 2,6-dimethyl-2,4,6-tri (4-hydroxyphenol) heptane, 2,6-dimethyl-2,4,6-tri (4-hydroxyphenol) heptene-3, 2,6-dimethyl-2,4,6-tri (4-hydroxyphenol) heptane, 1,3,5-tri (4-hydroxyphenyl) benzene and 1,1,1-tri (4-hydroxyphenyl) ethane, or 3,3-bis (4-hydroallyl) oxyindole [isatin (bisphenyl A], 5-chloroisatin, 5.7-dichloroisatin or 5-bromoisatin.

in order to regulate the molecular weight, there may be used monovalent aromatic hydroxy compounds such as m- or p-methylphenol, m- or p-propylphenol, p-bromophenol, p-tert-butylphenol and p-long chain alkyl phenol.

Preferable polycarbonate-based resins are ones obtained by using bis (4-hydroxyphenyl) alkanes such as bisphenol A, ones obtained by using two or more aromatic dihydroxy compounds different from each other, and branched ones obtained by using the polyhdyroxy compounds. Specific examples thereof are disclosed in, for example, Japanese Patent Laid-Open No. (JP-A) 63-30524 and 56-55328, Japanese Patent Publication No. (JP-B) 55-414, 60-25049 and 3-49930). These polycarbonate-based resins may be used singly or in a mixture of two or more.

The poly (4-methylpentene-1) resin used in the present invention is not particularly restricted. Examples thereof are homopolymer of 4-methylpentene-1 having a density of from 0.830 to 0.840 g/cm$^3$, and copolymers of 80% by mol or more of 4-methylpene-1 with α-olefins such as, for example, ethylene, propylene, butene-1, hexene-1, octene-1 and heptene-1.

Among them, those having a melting point of from 200 to 242° C., a vicat softening point (ASTM D-1525) of from 140 to 175° C., a melt flow rate (ASTM D-1238; 260° C., 5 kg load) of from 2 to 180 g/10 minutes, and a tensile breaking elongation (ASTM D-638; 23° C., pull speed 5 mm/minute) of not more than 100%, preferably from 15 to 85%, more preferably from 15 to 30%, are preferable from a viewpoint of heat resistance and "saw blade" cutting characteristics. Such poly (4-methylpetene-1) resins are available from Mitsui Petrochemical Industries, Ltd., under the trade name of TPX in the grade of RT18, DX820, DX845, MX004 and MX320XB.

In the present invention, methacrylate resins such as polymethy methacrylates, polybutenes, polyesters and polyamides which are well known in the art can be successfully used as the chlorine-free resin.

In addition, recycled resins can be also used. In this specification, the recycled resin is intended to mean a scrap resin such as a trimming loss produced in a process wherein a film is formed by, for example, a T-die method or inflation method using the above-mentioned chlorine-free resins, and a loss produced in a slit step wherein the formed film is cut into a suitable width, or a winding step wherein the film wound is re-wound with a small winder. In the present invention, the recycled resin can be used singly or in a mixture thereof with fresh chlorine-free resins as described above. Further, the recycled resin may include scrap resins produced from the production of a film or other molded articles using chlorine-free resins other than those described above.

In carrying out the present invention, the non-oriented multi-layer film is formed by a combination use of the chlorine-free resins described above according to the following design basis, thereby satisfying the properties (a) to (h).

In order to exhibit a desired "saw blade" cutting characteristics, at least one layer constituting the multi-layer is low in the tensile breaking elongation. The said layer can be formed using the styrene-based resins, the polycarbonate-based resins, poly(4-methylpentene-1)resins or polymethyl methacrylate.

In order to obtain a desired self-tack property, the outer layers of the multi-layer film are formed with soft resins. Example of the soft resins are ethylene-based resins and propylene-based resins. The resin suitable for obtaining a desired "saw blade" cutting characteristics are relatively high in the tensile modulus. Therefore, the said soft resins are suitably used for the formation of the outer layers also in view of obtaining the multi-layer film having appropriate flexibility(2000 to 8000 Kg/cm² of the tensile moduli at longitudinal and transverse directions).

In order to attain a desired heat resistance, at least one layer constituting the multi-layer film is formed with resins of high heat resistance. Example of the resins are, for example, polycarbonate-based resins, poly(4-methylpentene-1)resins and propylene-based resins.

The layer constituting the multi-layer film can be formed using one or more resins selected from the chlorine-free resins described above, and the formed layer is combined with the other or the others to form the multi-layer film having two or more layers and satisfying the properties (a) to (h).

Preferred embodiments of combinations to form the multi-layer film satisfying the properties (a) to (h) are given as follows.

One embodiment is a combination of the propylene block copolymer (X) as an outer layer with the other resins such as the polycarbonate-based resins(Y), the styrene-based resins(Z) and the poly(4-methylpentene-1)resins(W) as a core layer in the form of outer layer/core layer/outer layer, i.e. (X)/(Y), (Z) or (W)/(X). The resulting multi-layer film in the form of (X)/(Y)/(X) has appropriate flexibility, and is much improved in the "saw blade" cutting characteristics, heat resistance and flavor- or taste-keeping property. The multi-layer films of (X)/(Z)/(X) and (X)/(W)/(X) have appropriate flexibility and are much improved in the "saw blade" cutting characteristics and in the heat resistance, respectively. In the above combinations, the resins (Y), (Z) and (W) can be replaced with the recycled resins to reduce the production cost.

Another embodiment is a combination of a mixture(U) of the propylene block copolymer and the other propylene-based resins, particularly those having a maximum melting peak temperature($T_{pm}$) of not lower than 150° C., as an outer layer with (Y), (Z) and (W) as a core layer in the form of outer layer/core layer/outer layer, i.e. (U)/(Y), (Z) or (W)/(U). The multi-layer film in the form of (U)/(Y)/(U) has appropriate flexibility and is much improved in the "saw blade" cutting characteristics, flavor- or taste-keeping property and microwave oven suitability. The multi-layer films of (U)/(Z)/(U) and (U)/(W)/(U) are appropriate in flexibility and are much improved in the "saw blade" cutting characteristics and microwave oven suitability, and in the heat resistance and microwave oven suitability, respectively. Also, in this case, the recycled resins can be used in place of (Y), (Z) and (W) to reduce the production cost.

The other embodiment is a combination of a mixture(T) of the propylene-based resins and a hydrogenated styrene-butadiene rubber with (Y), (Z) and (W) in the form of (T)/(Y), (Z) or (W)/(T). The multi-layer film of (T)/(Y)/(T) of 2:1:2 in the film thickness ratio is particularly improved in the flavor- or taste-keeping property and others. The multi-layer film of (T)/(Z)/(T) is excellent in the "saw blade" cutting characteristics, and that of (T)/(W)/(T) of 2:1:2 in the film thickness ratio is excellent in the heat resistance. These multi-layer films may comprise at least one film formed with the recycled resin.

The self-tack wrapping film of the present invention can be produced by forming the multi-layer film according to a known method such as, for example, T-die method and inflation method. For forming the multi-layer film, there are listed, for example, a method in which respective monolayer films separately formed using the chlorine-free resins are bonded in tight contact, and a method in which a desired multi-layer film is produced using a T-die film forming machine or an inflation film forming machine, which is a co-extrusion type capable of forming, for example, three layers from two resins different from each other.

In forming the layer or layers using the chlorine-free resins, if desired, additives generally used such as, for example, antioxidants, stabilizers, anti-static agents, tackifiers, anti-fogging agents and surfactants may be mixed.

The present invention is illustrated in more detail with reference to the following Examples which are only illustrative and not to be construed to limit the scope of the present invention.

In Examples, the tensile breaking elongation and load, tensile modulus(Young's modulus), tackiness, heat resistant temperature(heat resistance) and thermal shrinkage percent of the multi-films obtained were measured according to the methods described above, the weight ratio, intrinsic viscosity and ethylene content of the components A and B in the propylene block copolymer obtained were measured and calculated also according to the methods described above, and the other were as follows.

"Saw blade" cutting characteristics:

The film to be tested was rolled on a core, and put into a case made of coated cardboard having a basis weight of 500 g/m$^2$, the case being provided with a "saw blade" obtained by punching out an iron plate having a thickness of 0.2 mm into a shape of saw. The cutting characteristics of the thus prepared film were evaluated on the basis of the following criteria.

Good: The film could be smoothly cut even by softly pulling the film brought into contact with the "saw blade".

No good: The film could not be cut without a certain technique because of too large elongation, or could not be cut in the least.

Microwave oven suitability:

Using the film to be tested of 10 cm width×15 cm length, deep-fried food (frozen chicken) were wrapped, and heated for 90 seconds in a 500 W output microwave oven, and then evaluated on the basis of the following criteria.

◎: Neither perforation nor thermal fusion was observed.

○: No perforation was observed, but some thermal fusion was partially observed. However, it was not so serious from a viewpoint of practical use.

X: The film was thermally fused to produce perforations.

Melt flow rate (MFR) of the propylene block copolymer:

Measured according to JIS K7210 by the method of condition -14.

Maximum melting peak temperature ($T_{pm}$) of the mixture of propylene-based resins:

Ten milligrams of a sample was molten at 220° C. under a nitrogen atmosphere for 5 minutes using a differential scanning calorimeter (DSC manufactured by Perkin Elmer Corp.), and cooled down to 40° C. at a temperature lowering speed of 5° C./minute. Thereafter, it was again heated at a rising speed of 5° C./minute. The peak temperature of the maximum peak in the heat of fusion-endothermic curve was recorded as the maximum melting peak temperature ($T_{pm}$).

Herein, the melting point of indium (In) measured at a temperature rising speed of 5° C./minute using this measuring apparatus was found to be 156.6° C.

EXAMPLE 1

Synthesis of Solid Catalyst

A 200 L SUS reaction vessel equipped with a stirrer was purged with nitrogen, and then, 80 L of hexane, 6.55 mol of tetrabutoxytitanium, 2.8 mol of diisobutyl phthalate and 98.9 mol of tetraethoxysilane were charged in to the vessel to prepare a uniform solution. Then 51 L of a diisobutyl ether solution of butylmagnesiumchloride having a concentration of 2.1 mol/L was gradually added dropwise over 5 hours, while maintaining the temperature in the reaction vessel at 5° C. After completion of the dropping, the solution was further stirred for 1 hour at 20° C., the solid component was separated from the liquid component at 20° C., and washing with 70 L of toluene was repeated three times. Then, toluene was added to make the slurry concentration to 0.2 kg/L, and subsequently 47.6 mol of diisobutyl phthalate was added, and the mixture was reacted at 95° C. for 30 minutes. After the reaction, solid-liquid separation was conducted, and washing with toluene was repeated twice. Then, 3.13 mol of diisobutyl phthalate, 8.9 mol of butyl ether and 274 mol of titanium tetrachloride were added, and the mixture was reacted at 105° C. for 3 hours. After completion of the reaction, solid-liquid separation was conducted at that temperature, then washing with 90 L of toluene was repeated twice also at that temperature. Then, the slurry concentration was regulated to 0.4 kg/L, subsequently 8.9 mol of butyl ether and 137 mol of titanium tetrachloride were added, and the mixture was reacted at 105° C. for 1 hour. After completion of the reaction, solid-liquid separation was conducted at that temperature, and washing with 90 L of toluene was repeated three times also at that temperature, then washing with 70 L of hexane was further repeated three times, then the resulting solution was dried under reduced pressure to obtain 11.4 kg of a solid catalyst component. The solid catalyst component contained 1.8% by weight of a titanium atom, 20.1% by weight of a magnesium atom, 8.4% by weight of a phthalate, 0.3% by weight of an ethoxy group and 0.2% by weight of a butoxy group, and was a preferable particle containing no fine particle.

Production of Propylene Block Copolymer

Activation of Solid Catalyst Component

Into a SUS autoclave equipped with a stirrer having an inner volume of 3 L were charged 1.5 L of fully dehydrated and degassed n-hexane, 37.5 mmol of triethylaluminum, 37.5 mmol of t-butyl-n-propyldimethoxysilane and 15 g of the above-described solid catalyst component, and 15 g of propylene was continuously supplied over 30 minutes while maintaining the inner temperature of the vessel at not more than 30° C. Then the resulting solid catalyst slurry was transferred to a SUS autoclave equipped with a stirrer having an inner volume of 150 L, and to this was added 100 L of liquid butane and the mixture was preserved.

Polymerization

Two SUS fluidized bed reaction vessels each equipped with a stirrer and having an inner volume of 1 m$^3$ were connected from each other, and the copolymerization of propylene with ethylene as the first step (component A) was conducted in the first vessel, and the copolymerization of propylene with ethylene as the second step (component B) was conducted in the second vessel, continuously.

(1) First Step

Into the first vessel kept at a polymerization temperature of 70° C. and a polymerization pressure of 18 kg/cm$^2$G, propylene, ethylene and hydrogen were continuously supplied so as to make a hydrogen concentration of the gas phase and an ethylene concentration of the gas phase 0.2% by volume and 2.5% by volume, respectively, while continuously supplying 75 mmol/h of triethylaluminum, 7.5 mmol/h of t-butyl-n-propyldimethoxysilane and 0.29 g/h of the activated solid catalyst component. The polymerization of propylene with ethylene was continued at a polymer hold amount in the fluidized bed of 45 kg, thereby obtaining 9.6 kg/h of a polymer. The resulting polymer was continuously transferred to the second vessel, while keeping the activated state. A part of the polymer was took out as a sample and analyzed to find an ethylene content of 3.7% by weight, and an intrinsic viscosity ([η]A) of 2.80 dl/g.

(2) Second Step

In the second vessel kept at a polymerization temperature of 80° C. and a polymerization pressure of 12 kg/cm$^2$G, the polymerization of the catalyst containing-polymer transferred from the first vessel was successively continued at a polymer hold amount in the fluidized bed of 80 kg, while continuously supplying propylene, ethylene and hydrogen so as to make a hydrogen concentration of the gas phase and an ethylene concentration of the gas phase 0.2% by volume and 9.0% by volume, respectively, thereby obtaining 18.1 kg/h of a white polymer having excellent flowability.

The ethylene content of the obtained polymer was found to be 8.8% by weight, and the intrinsic viscosity ([η]B) 2.89 dl/g.

From the above results, the polymerization ratio of the first vessel to the second vessel was found to be 53/47, and the etylene content of the component B and the intrinsic viscosity thereof ($[\eta]B$) were calculated to be 14.6% by weight and 3.0 dl/g, respectively. Therefore, $[\eta]B/[\eta]A$ was 1.1.

The obtained polymer was thermally decomposed in the presence of a peroxide to obtain a desired propylene block copolymer having MFR of 2.6 g/10 minutes.

The content of a component soluble in xylene at 20° C. and having a weight average molecular weight of 26000 or less contained in the propylene block copolymer was 1.4% by weight.

Production of Multi-Layer Film

Using a 3-component, 3-layer co-extrusion T-die film forming machine manufactured by Modern Machinery Corp., was formed a multi-layer film having a 2-component, 3-layer structure of (X)/(Y)/(X) wherein the outer layers (Xs) were composed of the above-obtained propylene block copolymer, and the core layer (Y) was composed of a polycarbonate-based resin (Caliber 200-13 manufactured by Sumitomo Dow Co.). More specifically, the propylene block copolymer was melt-kneaded at 280° C. separately using two extruders each having φ of 40 mm and L/D of 32 and the molten resins were introduced to the outer layer-forming portion through a feed block. While, the polycarbonate-based resin was melt-kneaded at 280° C. using an extruder having φ of 50 mm and L/D of 32 and the molten resin was introduced to the core layer-forming portion through a feedblock. Successively, the molten resins were extruded through a T-die (600 mm width) kept at 280° C. and drawn on a chill roll of 20° C. for cooling and solidification, thereby obtaining the multi-film having a total thickness of 12 μm. In this example, a thickness ratio of the layers (X)/(Y)/(X) and the line speed were regulated to be 2/1/2 and 50 m/minute, respectively. The results of the obtained multi-film are as shown in Table 1.

EXAMPLE 2

Example 1 was repeated, provided that the outer layer-forming resin was replaced by a blended resin of the above propylene block copolymer and a polypropylene homopolymer (FS2011D manufactured by Sumitomo Chemical Co., Ltd., maximum melting peak temperature ($T_{pm}$): 158° C.) in a weight ratio of 6:4. The results are as shown in Table 1.

EXAMPLE 3

Example 1 was repeated, provided that the outer layer-forming resin was replaced by a blend of the same polypropylene homopolymer as in Example 2 and a hydrogenated styrene-butadiene rubber (Dynaron 1320 P manufactured by Japan Synthetic Rubber Co., Ltd.) in a weight ratio of 8:2. The results are as shown in Table 1.

EXAMPLE 4

Example 3 was repeated, provided that the core film-forming resin was replaced by a wide use polystyrene resin (Sumibrite E 183 manufactured by Sumitomo Chemical Co., Ltd.). The results are as shown in Table 1.

EXAMPLE 5

Example 1 was repeated, provided that the core film-forming resin was replaced by a poly (4-methylpentene-1) resin (TPX-MX 021 manufactured by Mitsui Petrochemical Industries Ltd.), and the thickness ratio of the layers was changed to 1/2/1. The results are as shown in Table 1.

COMPARATIVE EXAMPLE 1

Example 1 was repeated, provided that the outer layer-forming resin was replaced by a propylene-ethylene-butene-1 random copolymer (Norbrene FL 6632 manufactured by Sumitomo Chemical Co., Ltd.). The results are as shown in Table 2.

COMPARATIVE EXAMPLE 2

Example 1 was repeated, provided that the core film-forming resin was replaced by a polyamide resin (nylon-6; Novamid 1020 manufactured by Mitsubishi Chemical Corp.). The results are as shown in Table 2.

COMPARATIVE EXAMPLE 3

Example 1 was repeated, provided that both the outer layer-forming resin and the core layer-forming resin were replaced by a low density polyethylene (Sumikacene CE 3606 manufactured by Sumitomo Chemical Co., Ltd.), and polypropylene homopolymer (Norbrene WF 949 C manufactured by Sumitomo Chemical Co., Ltd.), respectively. The results are as shown in Table 2.

COMPARATIVE EXAMPLE 4

Example 1 repeated, provided that both the outer layers and the core layer were formed using a low density polyethylene (Sumikacene CE 3506 manufactured by Sumitomo Chemical Co., Ltd.). The results are as shown in Table 2.

TABLE 1

|  | Example | | | | |
| --- | --- | --- | --- | --- | --- |
|  | 1 | 2 | 3 | 4 | 5 |
| Tensile breaking elongation (%) LD | 100 | 100 | 140 | 90 | 140 |
| Tensile breaking elongation (%) TD | 210 | 200 | 270 | 100 | 250 |
| Tensile breaking elongation ratio TD/LD | 2.10 | 2.00 | 1.93 | 1.11 | 1.79 |
| Tensile breaking load (kg/cm$^2$) LD | 440 | 490 | 430 | 320 | 300 |
| Tensile breaking load (kg/cm$^2$) TD | 310 | 350 | 350 | 280 | 280 |
| Tensile breaking load ratio LD/TD | 1.42 | 1.40 | 1.23 | 1.14 | 1.07 |
| Tensile modulus (kg/cm$^2$) LD | 5900 | 6500 | 6800 | 5800 | 4600 |
| Tensile modulus (kg/cm$^2$) TD | 5800 | 6300 | 6000 | 5200 | 4400 |
| Tackiness (g/10 cm) | 6.0 | 5.3 | 4.8 | 5.5 | 6.5 |
| Heat resistant temperature (° C.) | 140 | 140 | 150 | 150 | 180 |
| Thermal shrinkage (%) LD | 3 | 3 | 4 | 3 | 2 |
| Thermal shrinkage (%) TD | 1 | 1 | 2 | 2 | 1 |
| Saw blade cutting characteristics | Good | Good | Good | Good | Good |
| Microwave oven suitability | ○ | ⊚ | ⊚ | ⊚ | ⊚ |

Note:
LD: Longitudinal direction
TD: Transverse direction

TABLE 2

| | Comparative Example | | | |
|---|---|---|---|---|
| | 1 | 2 | 3 | 4 |
| Tensile breaking elongation (%) LD | 100 | 230 | 300 | 230 |
| Tensile breaking elongation (%) TD | 200 | 220 | 370 | 240 |
| Tensile breaking elongation ratio TD/LD | 2.00 | 0.96 | 1.23 | 1.04 |
| Tensile breaking load (kg/cm$^2$) LD | 480 | 620 | 160 | 180 |
| Tensile breaking load (kg/cm$^2$) TD | 330 | 530 | 110 | 100 |
| Tensile breaking load ratio LD/TD | 1.45 | 1.17 | 1.45 | 1.80 |
| Tensile modulus (kg/cm$^2$) LD | 7600 | 8500 | 4400 | 2000 |
| Tensile modulus (kg/cm$^2$) TD | 7400 | 7900 | 4600 | 2000 |
| Tackiness (g/10 cm) | 0.5 | 6.5 | 4.5 | 9.3 |
| Heat resistant temperature (° C.) | 140 | 160 | 150 | 110 |
| Thermal shrinkage (%) LD | 3 | 3 | 3 | Impossible |
| Thermal shrinkage (%) TD | 1 | 1 | 2 | Impossible |
| Saw blade cutting characteristics | Good | No good | No good | No good |
| Microwave oven suitability | ○ | ○ | ○ | x |

What is claimed is:

1. A self-tack wrapping film comprising a non-oriented multi-layer film of a chlorine-free resin, wherein said multi-layer film comprises outer layers and a core layer in the form of outer layer/core layer/outer layer wherein the outer layer comprises propylene block copolymer obtainable by a process which comprises producing 40 to 85% by weight of a component A which is a propylene-ethylene copolymer having an ethylene content of 1.5 to 6.0% by weight as a first step, and producing 60 to 15% by weight of a component B which is a propylene-ethylene copolymer having an ethylene content of 7 to 17% by weight as a second step, wherein an intrinsic viscosity of the component B ([η]B) is from 2 to 5 dl/g and a ratio of the intrinsic viscosity of the component B to that of the component A ([η]A), [η]B/[η]A, is from 0.5 to 1.8 and the core layer comprises a resin selected from the group consisting of polycarbonate and styrene-based resins, wherein the styrene-based resin is selected from the group consisting of polystyrene, acrylonitrile-styrene copolymer resin, and methacrylic acid-styrene copolymer resin, and wherein said multi-layer film satisfies the following properties (a) to (h), (a) tensile breaking elongation at a longitudinal direction (ELD) being from 10 to 150%, (b) ratio of a tensile breaking elongation at a transverse direction (ETD) to the tensile breaking elongation at a longitudinal direction (ELD), ETD/ELD, being from 0.5 to 3, (c) tensile breaking load at a longitudinal direction (LLD) being from 150 to 800 kg/cm$^2$, (d) ratio of the tensile breaking load at a longitudinal direction (LLD) to a tensile breaking load at a transverse direction (LDT), LLD/LTD, being from 0.5 to 2, (e) tensile modulus at a longitudinal direction and that a transverse direction being from 200 to 8000 kg/cm$^2$, respectively, (f) tackiness being from 3 to 20 g/10 cm, (g) heat resistant temperature being 140° C. or higher, and (h) thermal shrinkage percent at a longitudinal direction and that at a transverse direction being 10% or less.

2. A self-tack wrapping film comprising a non-oriented multi-layer film of a chlorine-free resin, which satisfies the following properties (a) to (h), (a) tensile breaking elongation at a longitudinal direction (ELD) being from 10 to 150%, (b) ratio of a tensile breaking elongation at a transverse direction (ETD) to the tensile breaking elongation at a longitudinal direction (ELD), ETD/ELD, being from 0.5 to 3, (c) tensile breaking load at a longitudinal direction (LLD) being from 150 to 800 kg/cm$^2$, (d) ratio of the tensile breaking load at a longitudinal direction (LLD) to a tensile breaking load at a transverse direction (LDT), LLD/LTD, being from 0.5 to 2, (e) tensile modulus at a longitudinal direction and that a transverse direction being from 200 to 8000 kg/cm$^2$, respectively, (f) tackiness being from 3 to 20 g/10 cm, (g) heat resistant temperature being 140° C. or higher, and (h) thermal shrinkage percent at a longitudinal direction and that at a transverse direction being 10% or less, wherein said multi-layer film is in the form of an outer layer/core layer/outer layer wherein the outer layer is a layer of a mixture of 95 to 50% by weight of the propylene block copolymer obtainable by a process which comprises producing 40 to 85% by weight of a component A which is a propylene-ethylene copolymer having an ethylene content of 1.5 to 6.0% by weight as a first step, and producing 60 and 15% by weight of a component B which is a propylene-ethylene copolymer having an ethylene content of 7 to 17% by weight as a second step, wherein an intrinsic viscosity of the component B ([η]B) is from 2 to 5 dl/g and a ratio of the intrinsic viscosity of the component B to that of the component A ([η]A), [η]B/[η]A, is from 0.5 to 1.8, and 5 to 50% by weight of a propylene-based resin selected from the group consisting of propylene homopolymer, propylene-ethylene copolymer, propylene-butene-1 copolymer and propylene-ethylene-butene-1 copolymer having a maximum melting peak temperature (Tpm) of not less than 150° C. and the core layer is a layer of a polycarbonate or a styrene-based resin, wherein the styrene-based resin is selected from the group consisting of polystyrene, acrylonitrile-styrene copolymer resin, and methacrylic acid-styrene copolymer resin.

* * * * *